US012619054B2

(12) United States Patent
Noh et al.

(10) Patent No.: US 12,619,054 B2
(45) Date of Patent: May 5, 2026

(54) SMALL LENS SYSTEM

(71) Applicant: SEKONIX CO., LTD., Gyeonggi-do (KR)

(72) Inventors: Ki Youn Noh, Gyeonggi-do (KR); Min Su Jeong, Gyeonggi-do (KR); Chae Yeong Kim, Gyeonggi-do (KR); Ji Young Choi, Gyeonggi-do (KR); Seong Jun Bae, Gyeonggi-do (KR); In Jeong Hwang, Gyeonggi-do (KR)

(73) Assignee: SEKONIX CO., LTD., Gyeonggi-do (KR)

( * ) Notice: Subject to any disclaimer, the term of this patent is extended or adjusted under 35 U.S.C. 154(b) by 310 days.

(21) Appl. No.: 18/365,657

(22) Filed: Aug. 4, 2023

(65) Prior Publication Data

US 2024/0053586 A1     Feb. 15, 2024

(30) Foreign Application Priority Data

Aug. 9, 2022     (KR) ........................ 10-2022-0098925

(51) Int. Cl.
*G02B 13/00*          (2006.01)

(52) U.S. Cl.
CPC ................................ *G02B 13/0045* (2013.01)

(58) Field of Classification Search
CPC ....... G02B 13/0045; G02B 9/60; G03B 30/00
See application file for complete search history.

(56) References Cited

U.S. PATENT DOCUMENTS

2024/0045178 A1*     2/2024     Moon .................... G02B 13/02

FOREIGN PATENT DOCUMENTS

| KR | 20220032891 A | * | 3/2022 | ............ G02B 13/18 |
| KR | 20220082525 A | * | 6/2022 | .............. G02B 9/60 |

* cited by examiner

*Primary Examiner* — Tuyen Tra
(74) *Attorney, Agent, or Firm* — Mendelsohn Dunleavy, P.C.

(57)                    ABSTRACT

Disclosed is a small lens system including a first lens, a second lens, a third lens, a fourth lens, and a fifth lens sequentially arranged from an object, wherein the clear aperture of an object-side surface L1S1_CA (clear aperture) and the clear aperture of an image-side surface L1S2_CA (clear aperture) of the first lens satisfy 1<L1S2_CA/L1S1_CA<1.2.

18 Claims, 5 Drawing Sheets

SMALL LENS SYSTEM

CROSS REFERENCE TO RELATED APPLICATION

The present application claims priority to Korean Patent Application No. 10-2022-0098925, filed Aug. 9, 2022, the entire contents of which is incorporated herein for all purposes by this reference.

BACKGROUND OF THE INVENTION

Field of the Invention

The present invention relates to a small lens system including a total of five lenses, and more particularly to a small lens system configured such that aberration of the lens system is corrected while the lens system is small and lightweight by appropriately designing the refractive power, shape, etc. of each lens.

Description of the Related Art

With recent increasing demand for high quality, high performance, miniaturization, and weight lightening of electronic equipment having a camera function, particularly smartphones, research to realize the same through improvement in performance of a subminiature lens optical system has been conducted.

In addition, as zoom functions of smartphones are extended and foldable smartphones are launched, the overall length of a lens system has become shorter and shorter and high-resolution, miniaturization, and weight lightening technologies are in greater demand. Furthermore, it is advantageous to miniaturize a camera by reducing the size of a camera opening. To this end, it is important to reduce an effective diameter of a first lens.

Particularly, for a small lens mounted in a smartphone, it is advantageous to reduce the length of the lens system (total track length) as much as possible due to limitation in the thickness of the smartphone.

An optical lens system disclosed in Korean Patent Application Publication No. 10-2022-0019487, as the prior art, includes a total of five lenses sequentially arranged from an object, wherein TTL/ImageH=5.363, which is long. In addition, Fno=2.84. That is, the diameter of a stop is small, whereby picture quality is low, and therefore there is a limitation in designing a small high-resolution lens system.

SUMMARY OF THE INVENTION

The present invention has been made in view of the above problems, and it is an object of the present invention to provide a small lens system including a total of five lenses and configured such that aberration of the lens system is corrected while the lens system is small and lightweight by appropriately designing the refractive power, shape, etc. of each lens.

In accordance with an aspect of the present invention, the above and other objects can be accomplished by the provision of a small lens system including a first lens, a second lens, a third lens, a fourth lens, and a fifth lens sequentially disposed from an object, wherein a stop is located between the second lens and the third lens, the first lens has a negative refractive power, a convex object-side surface, and a clear aperture of an image-side surface greater than the clear aperture of an object-side surface, the second lens has a positive refractive power and a convex object-side surface, the third lens has a negative refractive power, a concave object-side surface, and a concave image-side surface, the fourth lens has a negative refractive power and a convex object-side surface, the fifth lens has a positive refractive power, a convex object-side surface, and a convex image-side surface, and the clear aperture of the object-side surface L1S1_CA (clear aperture) and the clear aperture of the image-side surface L1S2_CA (clear aperture) of the first lens satisfy $1 < L1S2\_CA/L1S1\_CA < 1.2$.

In accordance with another aspect of the present invention, there is provided a small lens system including a first lens, a second lens, a third lens, a fourth lens, and a fifth lens sequentially disposed from an object, wherein a stop is located between the second lens and the third lens, the first lens has a positive refractive power, a convex object-side surface, and a clear aperture of an image-side surface greater than the clear aperture of the object-side surface, the second lens has a positive refractive power and a convex object-side surface, the third lens has a negative refractive power, a flat object-side surface, and a concave image-side surface, the fourth lens has a negative refractive power and a convex object-side surface, the fifth lens has a positive refractive power and a convex object-side surface, and the clear aperture of the object-side surface L1S1_CA (clear aperture) and the clear aperture of the image-side surface L1S2_CA (clear aperture) of the first lens satisfy $1 < L1S2\_CA/L1S1\_CA < 1.2$.

In accordance with a further aspect of the present invention, there is provided a small lens system including a first lens, a second lens, a third lens, a fourth lens, and a fifth lens sequentially disposed from an object, wherein a stop is located between the second lens and the third lens, the first lens has a negative infinite refractive power, a convex object-side surface, and a clear aperture of an image-side surface greater than the clear aperture of the object-side surface, the second lens has a positive refractive power, a convex object-side surface, and a convex image-side surface, the third lens has a negative refractive power, a concave object-side surface, and a concave image-side surface, the fourth lens has a negative refractive power and a convex object-side surface, the fifth lens has a positive refractive power, a convex object-side surface, and a convex image-side surface, and the clear aperture of the object-side surface L1S1_CA (clear aperture) and the clear aperture of the image-side surface L1S2_CA (clear aperture) of the first lens satisfy $1 < L1S2\_CA/L1S1\_CA < 1.2$.

Here, the axial distance Sag21 from the center of the object-side surface to the outermost side of the clear aperture of the object-side surface of the first lens and the axial distance Sag22 from the center of the image-side surface to the outermost side of the clear aperture of the image-side surface of the first lens may satisfy $0.3 < Sag22/Sag21 < 0.6$.

In addition, the effective focal distance f of the lens system and the focal distance f2 of the second lens may satisfy $2 < f/f2 < 3$.

In addition, the center thickness L1_CT of the first lens and the center thickness L2_CT of the second lens may satisfy $0.16 < L1\_CT/L2\_CT < 0.22$.

In addition, the distance TTL from the center of the first lens to an image surface and an image surface height ImageH may satisfy $TTL/ImageH < 4.8$.

In addition, the center thickness L2_CT of the second lens and the edge thickness L2_ET of the second lens may satisfy $1.33 < L2\_CT/L2\_ET < 3$.

In addition, the effective focal distance f of the lens system and the entrance pupil diameter EPD of the lens system may satisfy f/EPD<2.8.

In addition, the field of view FOV of the lens system may satisfy FOV<22°.

In addition, all surfaces of the first to fifth lenses may be formed as aspherical surfaces, and each of the first to fifth lenses may be made of plastic.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention relates to a lens system including a total of five lenses, and more particularly to a small lens system configured such that a first lens, a second lens, a third lens, a fourth lens, and a fifth lens are sequentially arranged from an object along an optical axis.

In addition, the lens system is configured such that chromatic aberration of the lens system is corrected while the lens system is small and lightweight by appropriately designing the refractive power and shape of each lens, whereby the lens system is easily applicable to a small high-resolution camera module, particularly a smartphone.

In particular, the first lens is configured such that the clear aperture of an image-side surface is greater than the clear aperture of an object-side surface while a convex object-side surface is provided, and the third lens is configured to have a concave or flat object-side surface and a concave image-side surface, which is advantageous in assembly of the lenses and application to a small camera module. In addition, this configuration is advantageous in correction of aberration of the lens system, and optical loss is minimized, whereby it is possible to obtain a more vivid image in low light conditions.

Figure 1:
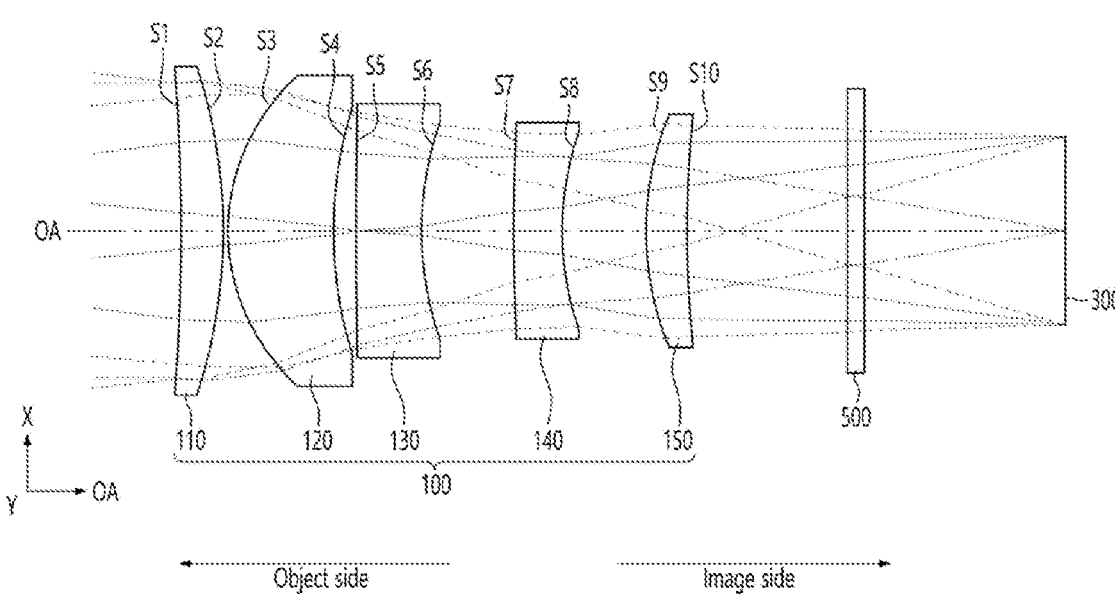
FIG. 1 is a view showing a conventional small lens system.
Figure 2:
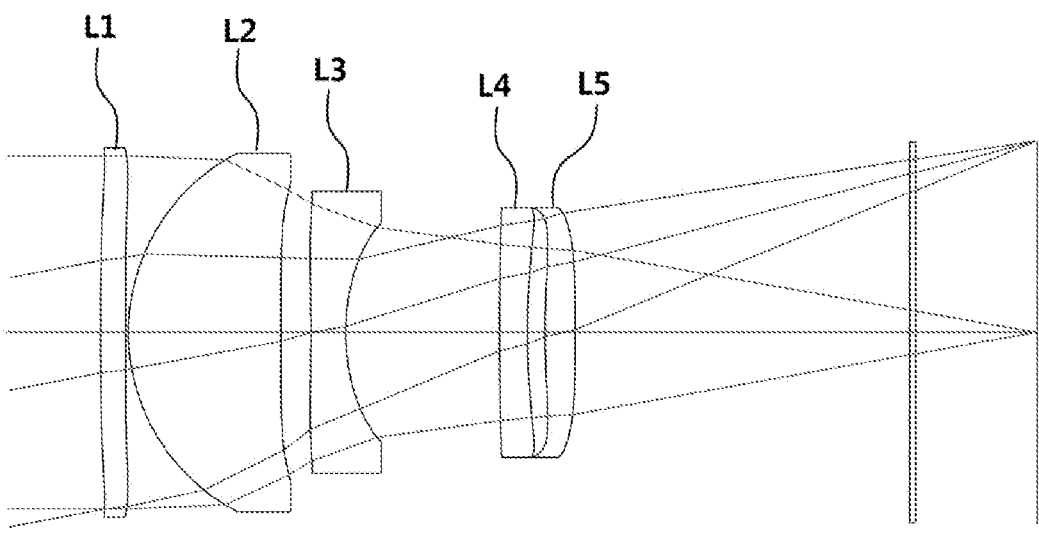
FIG. 2 is a view showing a first embodiment of a small lens system according to the present invention.
Figure 3:
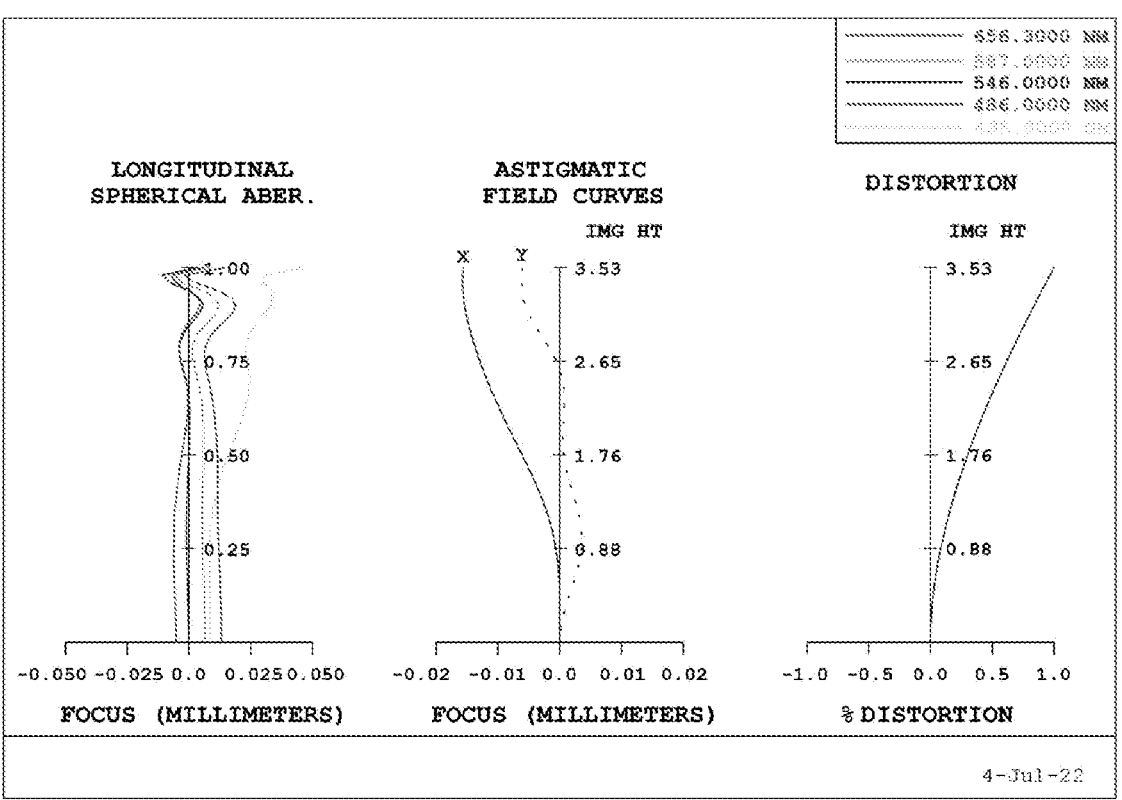
FIG. 3 is a view showing aberration according to a first embodiment of the present invention.
Figure 4:
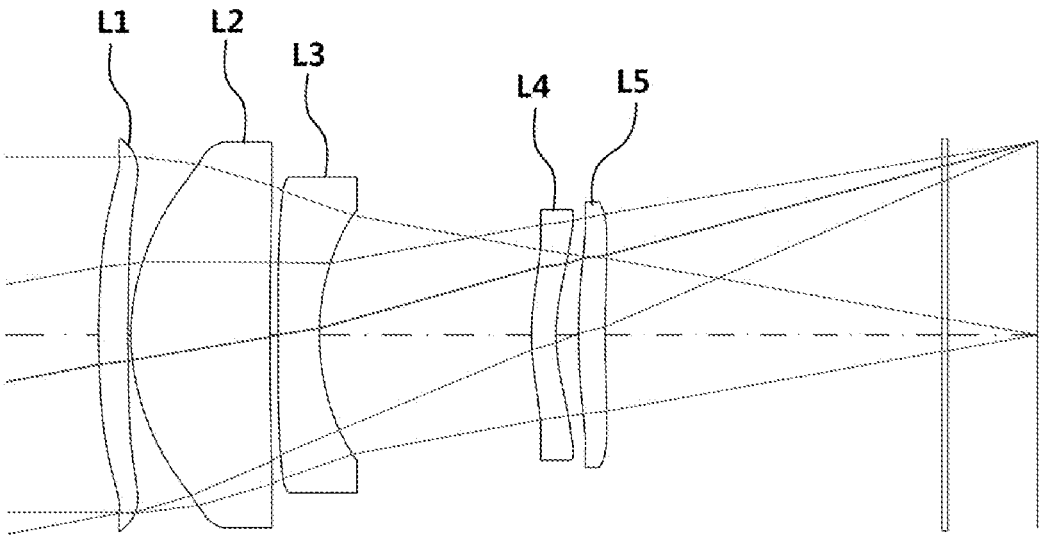
FIG. 4 is a view showing a second embodiment of the small lens system according to the present invention.
Figure 5:
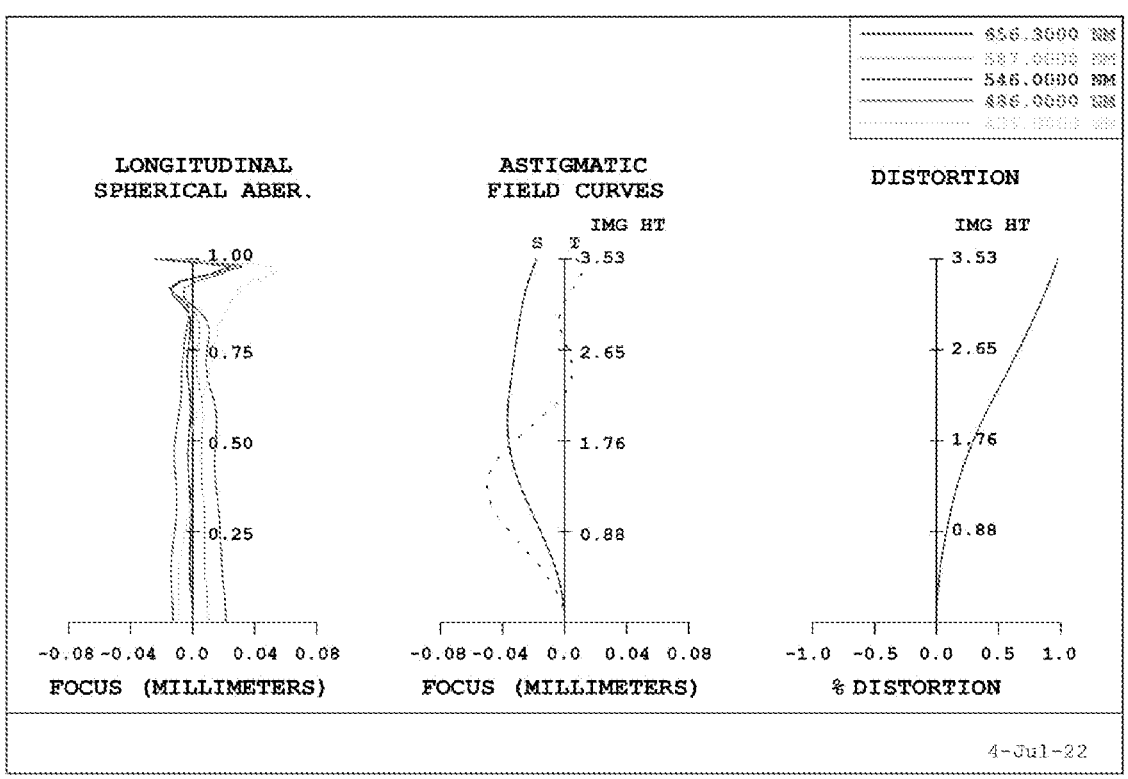
FIG. 5 is a view showing aberration according to a second embodiment of the present invention.
Figure 6:
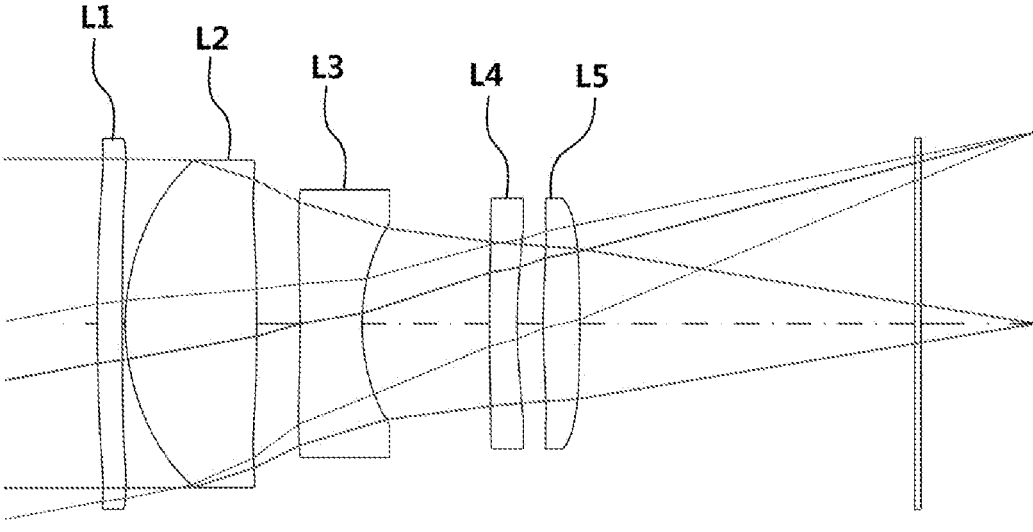
FIG. 6 is a view showing a third embodiment of the small lens system according to the present invention.
Figure 7:
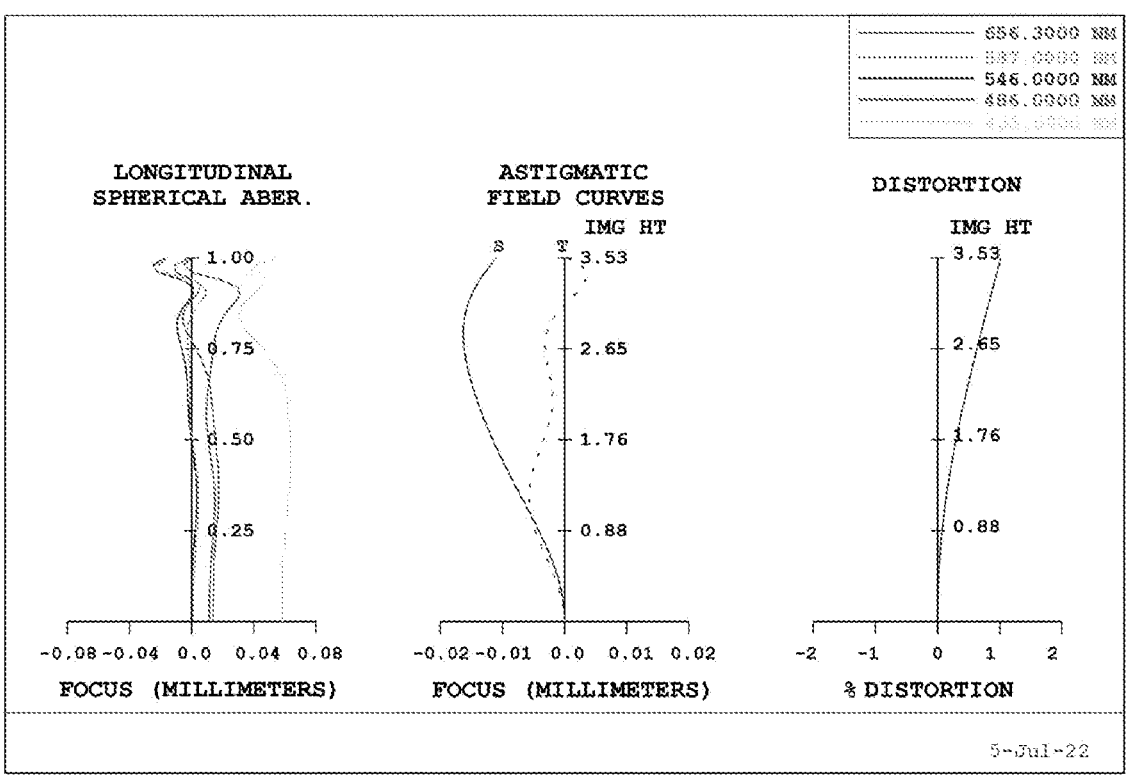
FIG. 7 is a view showing aberration according to a third embodiment of the present invention.
Figure 8:
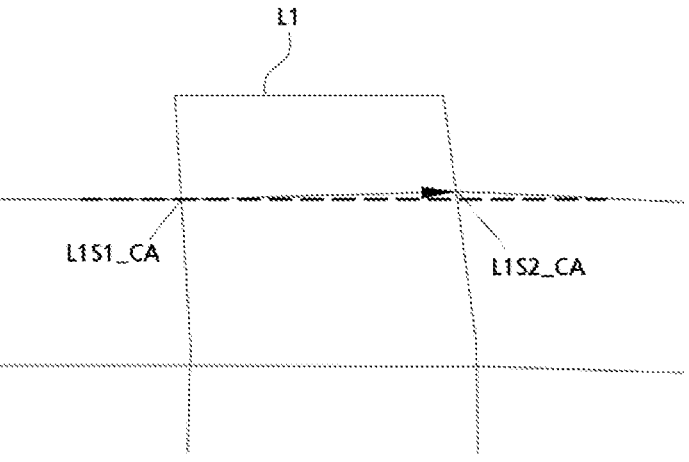
FIG. 8 is a view illustrating the clear aperture of an object-side surface L1S1_CA (clear aperture) and the clear aperture of an image-side surface L1S2_CA (clear aperture) of a first lens in the small lens system according to the present invention.
Figure 9:
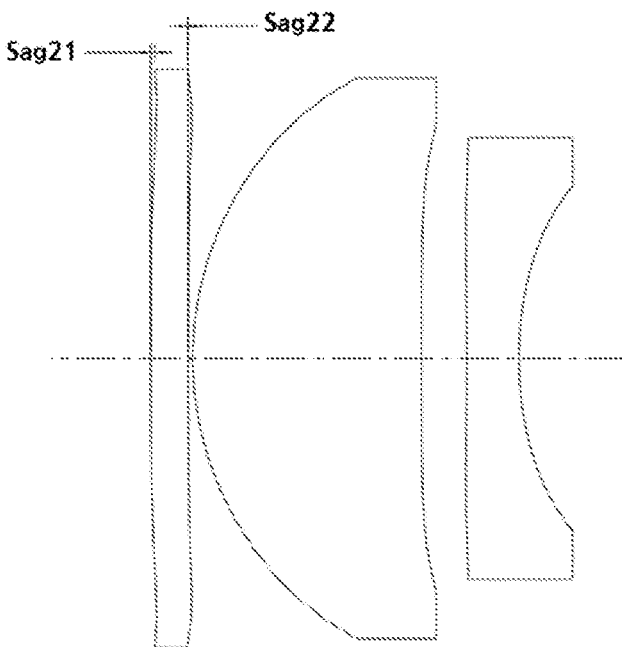
FIG. 9 is a view illustrating an axial distance Sag21 from the center of the object-side surface to the outermost side of the clear aperture of the object-side surface of the first lens and an axial distance Sag22 from the center of the image-side surface to the outermost side of the clear aperture of the image-side surface of the first lens in the small lens system according to the present invention.

Hereinafter, the present invention will be described in detail with reference to the accompanying drawings. FIG. 2 is a view showing a first embodiment of a small lens system according to the present invention, FIG. 3 is a view showing aberration according to a first embodiment of the present invention, FIG. 4 is a view showing a second embodiment of the small lens system according to the present invention, FIG. 5 is a view showing aberration according to a second embodiment of the present invention, FIG. 6 is a view showing a third embodiment of the small lens system according to the present invention, FIG. 7 is a view showing aberration according to a third embodiment of the present invention, FIG. 8 is a view illustrating the clear aperture of an object-side surface L1S1_CA (clear aperture) and the clear aperture of an image-side surface L1S2_CA (clear aperture) of a first lens in the small lens system according to the present invention, and FIG. 9 is a view illustrating an axial distance Sag21 from the center of the object-side surface to the outermost side of the clear aperture of the object-side surface of the first lens and an axial distance Sag22 from the center of the image-side surface to the outermost side of the clear aperture of the image-side surface of the first lens in the small lens system according to the present invention.

As shown, the small lens system according to the present invention includes a first lens L1, a second lens L2, a third lens L3, a fourth lens L4, and a fifth lens L5 sequentially arranged from an object along an optical axis, and a stop is located between the second lens L2 and the third lens L3.

In an embodiment of the present invention, the first lens L1 has a negative refractive power, a convex object-side surface, and a clear aperture of an image-side surface greater than the clear aperture of an object-side surface, the second lens L2 has a positive refractive power and a convex object-side surface, the third lens L3 has a negative refractive power, a concave object-side surface, and a concave image-side surface, the fourth lens L4 has a negative refractive power and a convex object-side surface, and the fifth lens L5 has a positive refractive power, a convex object-side surface, and a convex image-side surface.

In another embodiment of the present invention, the first lens L1 has a positive refractive power, a convex object-side surface, and a clear aperture of an image-side surface greater than the clear aperture of the object-side surface, the second lens L2 has a positive refractive power and a convex object-side surface, the third lens L3 has a negative refractive power, a flat object-side surface, and a concave image-side surface, the fourth lens L4 has a negative refractive power and a convex object-side surface, and the fifth lens L5 has a positive refractive power and a convex object-side surface.

In a further embodiment of the present invention, the first lens L1 has a negative infinite refractive power, a convex object-side surface, and a clear aperture of an image-side surface greater than the clear aperture of the object-side surface, the second lens L2 has a positive refractive power, a convex object-side surface, and a convex image-side surface, the third lens L3 has a negative refractive power, a concave object-side surface, and a concave image-side surface, the fourth lens L4 has a negative refractive power and a convex object-side surface, and the fifth lens L5 has a positive refractive power, a convex object-side surface, and a convex image-side surface.

In accordance with the above embodiments, the present invention provides a small lens system including a first lens L1 to a fifth lens L5, wherein the first lens L1 has a negative or positive refractive power, the second lens L2 has a positive refractive power, the third lens L3 has a negative refractive power, the fourth lens L4 has a negative refractive power, and the fifth lens L5 has a positive refractive power. Consequently, the small lens system is configured such that chromatic aberration of the lens system is corrected while the lens system is small and lightweight by appropriately designing the refractive power and shape of each lens, whereby the lens system is easily applicable to a small high-resolution camera module, particularly a smartphone.

The lens system according to the present invention is configured such that positive and negative refractive powers are evenly distributed over the lenses constituting the lens system, each lens is an aspherical lens, and each lens is convex or concave, which is suitable for application to a small high-resolution lens system.

In addition, the first lens L1 according to the present invention is configured such that the clear aperture of an image-side surface is greater than the clear aperture of an object-side surface while a convex object-side surface is provided, and the third lens L3 is configured to have a concave or flat object-side surface and a concave image-side surface, which is advantageous in assembly of the lenses and is more advantageous in application to a small camera module.

In the embodiments of the present invention, the clear aperture of the object-side surface L1S1_CA (clear aperture) and the clear aperture of the image-side surface L1S2_CA (clear aperture) of the first lens L1 satisfy 1<L1S2_CA/L1S1_CA<1.2. FIG. 8 illustrates the clear aperture of the object-side surface L1S1_CA (clear aperture) and the clear aperture of the image-side surface L1S2_CA (clear aperture) of the first lens L1.

The clear aperture of the object-side surface L1S1_CA (clear aperture) and the clear aperture of the image-side surface L1S2_CA (clear aperture) of the first lens L1 satisfy 1<L1S2_CA/L1S1_CA<1.2. Consequently, the first lens L1 is configured such that the clear aperture of the image-side surface is greater than the clear aperture of the object-side surface and the first lens has the convex object-side surface while the above range is satisfied.

This is further advantageous in miniaturization of a lens system and correction of aberration of the lens system and minimizes optical loss, whereby it is possible to obtain a more vivid image in low light conditions. If L1S2_CA/L1S1_CA is equal to or greater than 1.2, the difference between the clear aperture of the object-side surface and the clear aperture of the image-side surface of the first lens L1 is great, whereby assembly and manufacturing tolerance sensitivity is increased and aberration, such as chromatic aberration, is increased, and therefore resolution is lowered.

Also, in the embodiments of the present invention, the axial distance Sag21 from the center of the object-side surface to the outermost side of the clear aperture of the object-side surface of the first lens L1 and the axial distance Sag22 from the center of the image-side surface to the outermost side of the clear aperture of the image-side surface of the first lens L1 satisfy 0.3<Sag22/Sag21<0.6.

When the axial distance Sag21 from the center of the object-side surface to the outermost side of the clear aperture of the object-side surface of the first lens L1 and the axial distance Sag22 from the center of the image-side surface to the outermost side of the clear aperture of the image-side surface of the first lens L1 satisfy the above range, it is possible to alleviate lens assembly and manufacturing tolerance, which is advantageous in provision of a small lens system.

Also, in the embodiments of the present invention, the refractive powers are distributed such that the effective focal distance f of the lens system and the focal distance f2 of the second lens L2 satisfy 2<f/f2<3, whereby it is possible to alleviate tolerance sensitivity in assembly of five lenses, and therefore it is possible to provide a small high-resolution, high-quality lens system with excellent performance reproducibility. In addition, this is advantageous to aberration correction and miniaturization of the lens system.

Also, in the embodiments of the present invention, the center thickness L1_CT of the first lens L1 and the center thickness L2_CT of the second lens L2 satisfy 0.16<L1_CT/L2_CT<0.2, whereby it is possible to alleviate lens manufacturing tolerance, which is advantageous in manufacture of lenses. In addition, it is possible to minimize the thickness of each lens, which is advantageous for a small, lightweight lens system.

Also, in the embodiments of the present invention, the distance TTL from the center of the first lens L1 to an image surface and an image surface height ImageH satisfy TTL/ImageH<4.8. In this case, the overall length of the lens system is short, whereby the lens system may be useful for a zoom lens, a foldable smartphone, etc.

In addition, distortion of the lens system is corrected while the lens system is small and lightweight, and TTL is short, and therefore it is possible to provide a small high-resolution wide-angle lens system easily applicable to a thin or small camera module, particularly a smartphone.

Also, in the embodiments of the present invention, the center thickness L2_CT of the second lens L2 and the edge thickness L2_ET of the second lens L2 satisfy 1.33<L2_CT/L2_ET<3. That is, the center thickness of the second lens L2 is greater than the edge thickness of the second lens L2 within the range, whereby it is possible to reduce sensitivity while minimizing optical loss, and the length between the lenses is shortened, which is advantageous in implementation of a small lens system.

Also, in the embodiments of the present invention, the effective focal distance f of the lens system and the entrance pupil diameter EPD of the lens system satisfy f/EPD<2.8.

That is, the lens system according to the present invention provides an optical system having Fno of less than 2.8, which is advantageous in design of a small lens system, and it is possible to increase the diameter of the stop, whereby image height of axial light is increased, and therefore it is possible to realize high picture quality. Consequently, it is possible to provide a small, high-resolution, high-quality lens system.

Also, in the embodiments of the present invention, each of the first lens L1 to the fifth lens L5 is made of a plastic material, and all surfaces of the lenses are formed as aspherical surfaces, whereby it is possible to correct spherical aberration and chromatic aberration. Furthermore, each of the lenses is made of a material having a refractive index advantageous to reduce the length thereof, and the lenses are made of materials having appropriately distributed Abbe numbers so as to be advantageous in correction of chromatic aberration.

As described above, the present invention provides a lens system including a total of five lenses, more particularly a lens system configured such that chromatic aberration of the lens system is corrected while the lens system is small and lightweight by appropriately designing the refractive power, shape, etc. of each lens, whereby the lens system is easily applicable to a small high-resolution camera module, particularly a smartphone.

In particular, the first lens L1 is configured such that the clear aperture of an image-side surface is greater than the clear aperture of an object-side surface while a convex object-side surface is provided, and the third lens L3 is configured to have a concave or flat object-side surface and a concave image-side surface, which is advantageous in assembly of the lenses and is more advantageous in application to a small camera module.

In addition, the clear aperture of the object-side surface L1S1_CA (clear aperture) and the clear aperture of the image-side surface L1S2_CA (clear aperture) of the first lens L1 satisfy 1<L1S2_CA/L1S1_CA<1.2, which is further advantageous in miniaturization of a lens system and correction of aberration of the lens system and minimizes optical loss, whereby it is possible to obtain a more vivid image in low light conditions.

Hereinafter, embodiments of the present invention will be described with reference to the accompanying drawings.

First Embodiment

FIG. 2 is a view showing a first embodiment of a small lens system according to the present invention.

As shown, a first lens L1, a second lens L2, a third lens L3, a fourth lens L4, and a fifth lens L5 are sequentially arranged from an object on an optical axis. A stop is located between the second lens L2 and the third lens L3.

Table 1 below shows numerical data of the lenses constituting the lens system according to the first embodiment of the present invention.

TABLE 1-continued

| Surface Number | Surface Type | Y Radius | Thickness | Glass Code | Y Semi-Aperture |
|---|---|---|---|---|---|
| 5 | Asphere | 707.8568 | 0.5400 | | 2.6224 |
| Stop | Asphere | −68.6152 | 0.6243 | 634000.2390 | 2.3609 |
| 7 | Asphere | 4.1505 | 2.7614 | | 1.9303 |
| 8 | Asphere | 44.0441 | 0.5000 | 567000.3800 | 1.9707 |
| 9 | Asphere | 13.0481 | 0.3174 | | 2.0535 |
| 10 | Asphere | 15.5931 | 0.5455 | 661000.2040 | 2.0966 |
| 11 | Asphere | −42.8125 | 6.0000 | | 2.2000 |
| 12 | Sphere | infinity | 0.1100 | 'D263T' | 3.1746 |
| 13 | Sphere | infinity | 2.1812 | | 3.1858 |
| Image | Sphere | infinity | 0.0000 | | 3.5280 |

As shown in FIG. 2, the first lens L1, the second lens L2, the third lens L3, the fourth lens L4, and the fifth lens L5 are sequentially arranged from the object, and the Qcon polynomial of each lens based on Qcon asphere thereof is represented by Mathematical Expression 1 below.

$$z = \frac{cr^2}{1 + \sqrt{1 - (1 + k)c^2 r^2}} + u^4 \sum_{m=0}^{13} a_m Q_m^{con}(u^2) \qquad \text{[Mathematical Expression 1]}$$

Here, z indicates sag of a surface parallel to a z axis in the lens system, c indicates the vertex curvature of the lens at the vertex thereof, k indicates a conic constant, r indicates radial distance of the lens from the axis thereof, $r_n$ indicates a normalization radius, u indicates $r/r_n$, $a_m$ indicates an m-th Qcon coefficient, and $Q_m^{con}$ indicates a m-th Qcon polynomial.

TABLE 2

| Surface | 2 | 3 | 4 | 5 | Stop |
|---|---|---|---|---|---|
| Y Radius | 3.36681.E+02 | 1.20827.E+02 | 3.65932.E+00 | 7.07857.E+02 | −6.86152.E+01 |
| K | −9.90000.E+01 | 9.90000.E+01 | −5.14326.E−01 | 9.90000.E+01 | 9.90000.E+01 |
| 4th Qcon Coefficient | 2.20510.E−03 | −8.23429.E−04 | −1.94150.E−03 | 1.63444.E−03 | 8.19553.E−04 |
| 6th Qcon Coefficient | −7.96835.E−04 | 1.74659.E−04 | 9.59243.E−04 | 1.62629.E−04 | 6.37131.E−04 |
| 8th Qcon Coefficient | 2.60586.E−04 | 7.77280.E−05 | −1.49559.E−04 | −3.79072.E−05 | −2.48784.E−04 |
| 10th Qcon Coefficient | −4.83515.E−05 | −2.84319.E−05 | 1.32513.E−05 | 5.11571.E−06 | 2.80700.E−05 |
| 12th Qcon Coefficient | 5.22160.E−06 | 4.10630.E−06 | −1.31616.E−07 | 2.62743.E−06 | 1.94727.E−05 |
| 14th Qcon Coefficient | −3.34734.E−07 | −3.30168.E−07 | −6.64425.E−08 | −5.13617.E−07 | −7.18439.E−06 |
| 16th Qcon Coefficient | 1.13562.E−08 | 1.38984.E−08 | 5.28428.E−09 | 2.37390.E−08 | 9.08049.E−07 |
| 18th Qcon Coefficient | −1.50087.E−10 | −2.33582.E−10 | −1.21721.E−10 | −1.68824.E−10 | −4.17128.E−08 |
| 20th Qcon Coefficient | 0.00000.E+00 | 0.00000.E+00 | 0.00000.E+00 | 0.00000.E+00 | 0.00000.E+00 |

| Surface | 7 | 8 | 9 | 10 | 11 |
|---|---|---|---|---|---|
| Y Radius | 4.15046.E+00 | 4.40441.E+01 | 1.30481.E+01 | 1.55931.E+01 | −4.28125.E+01 |
| K | 6.38173.E−01 | 1.24296.E+01 | 1.17354.E+01 | 1.51656.E+01 | −9.90000.E+01 |
| 4th Qcon Coefficient | 1.67548.E−03 | −8.72991.E−04 | 3.26746.E−03 | 2.23324.E−03 | −1.01980.E−03 |
| 6th Qcon Coefficient | 4.20520.E−04 | −3.45826.E−03 | −9.29923.E−03 | −6.69040.E−03 | −2.43601.E−03 |
| 8th Qcon Coefficient | 5.69582.E−04 | 3.10747.E−03 | 6.12416.E−03 | 2.38113.E−03 | 6.75628.E−04 |
| 10th Qcon Coefficient | −5.53044.E−04 | −1.49434.E−03 | −2.48627.E−03 | −2.65765.E−04 | −2.05563.E−04 |
| 12th Qcon Coefficient | 2.88425.E−04 | 4.62873.E−04 | 6.78162.E−04 | −1.94569.E−04 | 8.99040.E−05 |
| 14th Qcon Coefficient | −7.72370.E−05 | −8.66113.E−05 | −1.15671.E−04 | 1.13962.E−04 | −3.79189.E−05 |
| 16th Qcon Coefficient | 1.03484.E−05 | 8.65080.E−06 | 1.09186.E−05 | −2.91164.E−05 | 9.68675.E−06 |
| 18th Qcon Coefficient | −5.52652.E−07 | −3.49993.E−07 | −4.69665.E−07 | 3.85114.E−06 | −1.30802.E−06 |
| 20th Qcon Coefficient | 0.00000.E+00 | 0.00000.E+00 | 0.00000.E+00 | −2.23841.E−07 | 7.01228.E−08 |

TABLE 1

| Surface Number | Surface Type | Y Radius | Thickness | Glass Code | Y Semi-Aperture |
|---|---|---|---|---|---|
| Object | Sphere | infinity | infinity | | |
| 1 | Sphere | infinity | 0.0000 | | 3.2624 |
| 2 | Asphere | 336.6808 | 0.4450 | 535000.5600 | 3.2500 |
| 3 | Asphere | 120.8270 | 0.0500 | | 3.2518 |
| 4 | Asphere | 3.6593 | 2.7391 | 535000.5600 | 3.1743 |

Here, in one embodiment of the present invention, the distance TTL from the center of the first lens L1 to an image surface and an image surface height ImageH satisfy TTL/ImageH=4.77, and the clear aperture of the object-side surface L1S1_CA (clear aperture) and the clear aperture of the image-side surface L1S2_CA (clear aperture) of the first lens L1 satisfy L1S2_CA/L1S1_CA=1.0.

Also, in one embodiment of the present invention, the axial distance Sag21 from the center of the object-side surface to the outermost side of the clear aperture of the object-side surface of the first lens L1 and the axial distance Sag22 from the center of the image-side surface to the outermost side of the clear aperture of the image-side surface of the first lens L1 satisfy Sag22/Sag21=0.374, and the effective focal distance f of the lens system and the focal distance f2 of the second lens L2 satisfy f/f2=2.65.

Also, in one embodiment of the present invention, the center thickness L1_CT of the first lens L1 and the center thickness L2_CT of the second lens L2 satisfy L1_CT/L2_CT=0.162, and the center thickness L2_CT of the second lens L2 and the edge thickness L2_ET of the second lens L2 satisfy L2_CT/L2_ET=2.42.

Also, in one embodiment of the present invention, the field of view FOV of the lens system satisfies FOV=21.8°, and the F number Fno of the lens system satisfies Fno=2.79.

FIG. 3 is a view showing aberration according to a first embodiment of the present invention.

First data of FIG. 3 show spherical aberration, wherein the horizontal axis indicates focus (mm), the vertical axis indicates image height (mm), and respective graphs indicate the wavelengths of incident rays. It is known that the more graphs approach the central vertical axis line and approach each other, as shown, the better the efficiency of correcting spherical aberration. The spherical aberration according to the first embodiment of the present invention is 0.025 mm (focus) or less, which is determined to be good.

Second data of FIG. 3 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the first embodiment of the present invention is 0.025 mm (focus) or less, which is determined to be good.

Third data of FIG. 3 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the first embodiment of the present invention, is 2% or less, which is determined to be good.

Second Embodiment

FIG. 4 is a view showing a second embodiment of the small lens system according to the present invention.

As shown, a first lens L1, a second lens L2, a third lens L3, a fourth lens L4, and a fifth lens L5 are sequentially arranged from an object on an optical axis. A stop is located between the second lens L2 and the third lens L3.

Table 3 below shows numerical data of the lenses constituting the optical system according to the second embodiment of the present invention.

TABLE 3

| Surface Number | Surface Type | Y Radius | Thickness | Glass Code | Y Semi-Aperture |
|---|---|---|---|---|---|
| Object | Sphere | infinity | infinity | | |
| 1 | Sphere | infinity | 0.0000 | | 3.3189 |
| 2 | Asphere | 24.1854 | 0.5200 | 535000.5600 | 3.2500 |
| 3 | Asphere | 45.2495 | 0.0500 | | 3.2635 |
| 4 | Asphere | 3.9705 | 2.4800 | 535000.5600 | 3.2000 |
| 5 | Asphere | 87.0744 | 0.1433 | | 2.7218 |
| Stop | Asphere | 2343395846.4782 | 0.7372 | 615000.2590 | 2.6221 |
| 7 | Asphere | 4.6315 | 3.7779 | | 2.1773 |
| 8 | Asphere | 4.5147 | 0.4390 | 535000.5600 | 2.0069 |
| 9 | Asphere | 3.5031 | 0.4003 | | 2.0774 |
| 10 | Asphere | 10.9363 | 0.4778 | 661000.2040 | 2.1302 |
| 11 | Asphere | 30.5278 | 6.0000 | | 2.2000 |
| 12 | Sphere | infinity | 0.1100 | 'D263T' | 3.2391 |
| 13 | Sphere | infinity | 1.5926 | | 3.2515 |
| Image | Sphere | infinity | 0.0000 | | 3.5280 |

As shown in FIG. 4, the first lens L1, the second lens L2, the third lens L3, the fourth lens L4, and the fifth lens L5 are sequentially arranged from the object, and the Qcon polynomial of each lens based on Qcon asphere thereof is represented by Mathematical Expression 1 above.

Qcon coefficients are obtained from Mathematical Expression 1 above as shown in Table 4 below.

TABLE 4

| Surface | 2 | 3 | 4 | 5 | Stop |
|---|---|---|---|---|---|
| Y Radius | 2.41854.E+01 | 4.52495.E+01 | 3.97051.E+00 | 8.70744.E+01 | 2.34340.E+09 |
| K | 1.36998.E+01 | 9.88534.E+01 | −1.07251.E+00 | −9.56085.E+01 | 2.24845.E+32 |
| 4th Qcon Coefficient | 4.21977.E−03 | 3.07773.E−03 | −6.38527.E−03 | 9.49814.E−04 | 4.34608.E−03 |
| 6th Qcon Coefficient | −9.27152.E−04 | 1.89629.E−03 | 2.52271.E−03 | −4.25574.E−03 | −4.19859.E−03 |
| 8th Qcon Coefficient | 4.17900.E−04 | −2.34181.E−04 | −4.64538.E−04 | 5.29639.E−03 | 5.38426.E−03 |
| 10th Qcon Coefficient | −1.50528.E−04 | −8.09057.E−05 | 9.41240.E−06 | −3.13936.E−0 3 | −3.48467.E−03 |
| 12th Qcon Coefficient | 3.38372.E−05 | 3.77218.E−05 | 1.67250.E−05 | 1.01819.E−03 | 1.21650.E−03 |
| 14th Qcon Coefficient | −4.49697.E−06 | −6.44368.E−06 | −3.79876.E−06 | −1.91193.E−04 | −2.45003.E−04 |
| 16th Qcon Coefficient | 3.42762.E−07 | 5.55724.E−07 | 3.96588.E−07 | 2.08160.E−05 | 2.86759.E−05 |
| 18th Qcon Coefficient | −1.39866.E−08 | −2.42770.E−08 | −2.15591.E−08 | −1.22487.E−06 | −1.82005.E−06 |
| 20th Qcon Coefficient | 2.36544.E−10 | 4.28765.E−10 | 4.96722.E−10 | 3.02636.E−08 | 4.86566.E−08 |

| Surface | 7 | 8 | 9 | 10 | 11 |
|---|---|---|---|---|---|
| Y Radius | 4.63148.E+00 | 4.51468.E+00 | 3.50313.E+00 | 1.09363.E+01 | 3.05278.E+01 |
| K | 1.93441.E−01 | −1.28789.E+01 | −8.59624.E+00 | 1.27888.E+01 | −2.64097.E+00 |
| 4th Qcon Coefficient | 2.53348.E−03 | 1.87014.E−03 | 4.86396.E−03 | −2.24669.E−03 | −8.75780.E−05 |
| 6th Qcon Coefficient | −1.39250.E−03 | −1.73754.E−02 | −1.96072.E−02 | −8.88217.E−03 | −7.12777.E−03 |
| 8th Qcon Coefficient | 1.75119.E−03 | 1.59847.E−02 | 2.11859.E−02 | 1.51213.E−02 | 1.10092.E−02 |
| 10th Qcon Coefficient | −1.30933.E−03 | −1.01560.E−02 | −1.57909.E−02 | −1.31749.E−02 | −9.13729.E−03 |
| 12th Qcon Coefficient | 5.37498.E−04 | 4.30558.E−03 | 7.61258.E−03 | 6.55831.E−03 | 4.43527.E−03 |
| 14th Qcon Coefficient | −1.26297.E−04 | −1.19170.E−03 | −2.31970.E−03 | −1.94868.E−03 | −1.30297.E−03 |
| 16th Qcon Coefficient | 1.70947.E−05 | 2.08622.E−04 | 4.31608.E−04 | 3.39377.E−04 | 2.27125.E−04 |

TABLE 4-continued

| | | | | | |
|---|---|---|---|---|---|
| 18th Qcon Coefficient | −1.23060.E−06 | −2.09564.E−05 | −4.45087.E−05 | −3.16866.E−05 | −2.15905.E−05 |
| 20th Qcon Coefficient | 3.61081.E−08 | 9.13627.E−07 | 1.93286.E−06 | 1.20626.E−06 | 8.60380.E−07 |

Here, in one embodiment of the present invention, the distance TTL from the center of the first lens L1 to an image surface and an image surface height ImageH satisfy TTL/ImageH=4.74, and the clear aperture of the object-side surface L1S1_CA (clear aperture) and the clear aperture of the image-side surface L1S2_CA (clear aperture) of the first lens L1 satisfy L1S2_CA/L1S1_CA=1.0.

Also, in one embodiment of the present invention, the axial distance Sag21 from the object-side surface center to the outermost side of the clear aperture of the object-side surface of the first lens L1 and the axial distance Sag22 from the image-side surface center to the outermost side of the clear aperture of the image-side surface of the first lens L1 satisfy Sag22/Sag21=0.395, and the effective focal distance f of the lens system and the focal distance f2 of the second lens L2 satisfy f/f2=2.37.

Also, in one embodiment of the present invention, the center thickness L1_CT of the first lens L1 and the center thickness L2_CT of the second lens L2 satisfy L1_CT/L2_CT=0.21, and the center thickness L2_CT of the second lens L2 and the edge thickness L2_ET of the second lens L2 satisfy L2_CT/L2_ET=1.893.

Also, in one embodiment of the present invention, the field of view FOV of the lens system satisfies FOV=21.8°, and the F number Fno of the lens system satisfies Fno=2.79.

FIG. 5 is a view showing aberration according to a second embodiment of the present invention.

First data of FIG. 5 show spherical aberration, wherein horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the second embodiment of the present invention is 0.025 mm (focus) or less, which is determined to be good.

Second data of FIG. 5 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the second embodiment of the present invention is 0.025 mm (focus) or less, which is determined to be good.

Third data of FIG. 5 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the second embodiment of the present invention, is 2% or less, which is determined to be good.

Third Embodiment

FIG. 6 is a view showing a third embodiment of the small lens system according to the present invention.

As shown, a first lens L1, a second lens L2, a third lens L3, a fourth lens L4, and a fifth lens L5 are sequentially arranged from an object on an optical axis. A stop is located between the second lens L2 and the third lens L3.

Table 5 below shows numerical data of the lenses constituting the optical system according to the third embodiment of the present invention.

TABLE 5

| Surface Number | Surface Type | Y Radius | Thickness | Glass Code | Y Semi-Aperture |
|---|---|---|---|---|---|
| Object | Sphere | infinity | infinity | | |
| 1 | Sphere | infinity | 0.0000 | | 3.2684 |
| 2 | Asphere | 76.1601 | 0.4463 | 535000.5600 | 3.2500 |
| 3 | Asphere | 74.9410 | 0.0500 | | 3.2102 |
| 4 | Asphere | 4.0675 | 2.3596 | 535000.5600 | 3.0000 |
| 5 | Asphere | −29.8766 | 0.7725 | | 3.2000 |
| Stop | Asphere | −29.7138 | 1.1143 | 634000.2390 | 2.2334 |
| 7 | Asphere | 4.2657 | 2.2759 | | 1.7562 |
| 8 | Asphere | 30.3676 | 0.5000 | 567000.3800 | 1.6297 |
| 9 | Asphere | 11.3462 | 0.4670 | | 1.6613 |
| 10 | Asphere | 14.9531 | 0.6544 | 661000.2040 | 1.8000 |
| 11 | Asphere | −43.1282 | 6.0000 | | 1.8000 |
| 12 | Sphere | infinity | 0.1100 | 'D263T' | 3.0795 |
| 13 | Sphere | infinity | 2.0631 | | 3.0944 |
| Image | Sphere | infinity | 0.0000 | | 3.5280 |

As shown in FIG. 6, the first lens L1, the second lens L2, the third lens L3, the fourth lens L4, and the fifth lens L5 are sequentially arranged from the object, and the Qcon polynomial of each lens based on Qcon asphere thereof is represented by Mathematical Expression 1 above.

Qcon coefficients are obtained from Mathematical Expression 1 above as shown in Table 6 below.

TABLE 6

| Surface | 2 | 3 | 4 | 5 | Stop |
|---|---|---|---|---|---|
| Y Radius | 7.61601.E+01 | 7.49410.E+01 | 4.06747.E+00 | −2.98766.E+01 | −2.97138.E+01 |
| K | 6.95887.E+00 | −9.90000.E+01 | −7.74349.E−01 | 9.21649.E+01 | 1.98938.E+01 |
| 4th Qcon Coefficient | 3.52837.E−03 | −2.44080.E−03 | −5.61941.E−03 | 8.50030.E−04 | 6.50284.E−03 |
| 6th Qcon Coefficient | −1.40545.E−03 | 6.32684.E−04 | 1.88730.E−03 | −1.03348.E−03 | −4.13264.E−03 |
| 8th Qcon Coefficient | 3.82790.E−04 | 2.56686.E−05 | −2.87149.E−04 | 5.83400.E−04 | 2.24906.E−03 |
| 10th Qcon Coefficient | −6.55010.E−05 | −2.54206.E−05 | 2.90564.E−05 | −1.35156.E−04 | −7.48883.E−04 |
| 12th Qcon Coefficient | 7.17895.E−06 | 4.45855.E−06 | −1.37549.E−06 | 1.88824.E−05 | 1.65947.E−04 |
| 14th Qcon Coefficient | −5.06399.E−07 | −4.33151.E−07 | −3.18335.E−08 | −1.40260.E−06 | −2.35572.E−05 |
| 16th Qcon Coefficient | 2.04767.E−08 | 2.22380.E−08 | 8.01255.E−09 | 3.25951.E−08 | 1.88555.E−06 |

TABLE 6-continued

| | | | | | |
|---|---|---|---|---|---|
| 18th Qcon Coefficient | −3.53482.E−10 | 4.59256.E−10 | −3.52717.E−10 | 7.86255.E−10 | −6.39441.E−08 |
| 20th Qcon Coefficient | 0.00000.E+00 | 0.00000.E+00 | 0.00000.E+00 | 0.00000.E+00 | 0.00000.E+00 |

| Surface | 7 | 8 | 9 | 10 | 11 |
|---|---|---|---|---|---|
| Y Radius | 4.26571.E+00 | 3.03676.E+01 | 1.13462.E+01 | 1.49531.E+01 | −4.31282.E+01 |
| K | 7.09562.E−01 | −5.23983.E+01 | 8.52368.E+00 | 1.21789.E+01 | 5.21938.E+01 |
| 4th Qcon Coefficient | 7.75058.E−03 | 7.61718.E−03 | 1.33758.E−02 | 3.06322.E−03 | −2.07262.E−03 |
| 6th Qcon Coefficient | −5.03802.E−03 | −1.10163.E−02 | −1.72497.E−02 | −7.29886.E−03 | −1.82267.E−03 |
| 8th Qcon Coefficient | 3.02298.E−03 | 3.91688.E−03 | 5.17052.E−03 | 1.86909.E−03 | 1.91543.E−04 |
| 10th Qcon Coefficient | −1.09668.E−03 | −1.72065.E−04 | 4.24496.E−04 | −4.72467.E−04 | −1.75780.E−04 |
| 12th Qcon Coefficient | 2.66265.E−04 | −2.17190.E−04 | −5.65052.E−04 | 4.33921.E−04 | 2.53487.E−04 |
| 14th Qcon Coefficient | −3.46771.E−05 | 5.76180.E−05 | 1.27597.E−04 | −2.12453.E−04 | −1.23511.E−04 |
| 16th Qcon Coefficient | 9.19094.E−07 | −5.91436.E−06 | −1.24960.E−05 | 4.75443.E−05 | 2.85949.E−05 |
| 18th Qcon Coefficient | 1.75374.E−07 | 2.24513.E−07 | 4.39734.E−07 | −4.94497.E−06 | −3.31886.E−06 |
| 20th Qcon Coefficient | 0.00000.E+00 | 0.00000.E+00 | 0.00000.E+00 | 1.76065.E−07 | 1.54964.E−07 |

Here, in one embodiment of the present invention, the distance TTL from the center of the first lens L1 to an image surface and an image surface height ImageH satisfy TTL/ImageH=4.77, and the clear aperture of the object-side surface L1S1_CA (clear aperture) and the clear aperture of the image-side surface L1S2_CA (clear aperture) of the first lens L1 satisfy L1S2_CA/L1S1_CA=1.0.

Also, in one embodiment of the present invention, the axial distance Sag21 from the object-side surface center to the outermost side of the clear aperture of the object-side surface of the first lens L1 and the axial distance Sag22 from the image-side surface center to the outermost side of the clear aperture of the image-side surface of the first lens L1 satisfy Sag22/Sag21=0.56, and the effective focal distance f of the lens system and the focal distance f2 of the second lens L2 satisfy f/f2=2.19.

Also, in one embodiment of the present invention, the center thickness L1_CT of the first lens L1 and the center thickness L2_CT of the second lens L2 satisfy L1_CT/L2_CT=0.189, and the center thickness L2_CT of the second lens L2 and the edge thickness L2_ET of the second lens L2 satisfy L2_CT/L2_ET=2.169.

Also, in one embodiment of the present invention, the field of view FOV of the lens system satisfies FOV=21.8°, and the F number Fno of the lens system satisfies Fno=2.79.

FIG. 7 is a view showing aberration according to a third embodiment of the present invention.

First data of FIG. 7 show spherical aberration, wherein the horizontal axis indicates focus (mm), the vertical axis indicates image height (mm), and respective graphs indicate the wavelengths of incident rays. It is known that the more the graphs approach the central vertical axis line and approach each other, as shown, the better the efficiency of correcting spherical aberration. The spherical aberration according to the third embodiment of the present invention is 0.025 mm (focus) or less, which is determined to be good.

Second data of FIG. 7 show astigmatism aberration, wherein the horizontal axis indicates focus (mm), the vertical axis indicates image height (mm), graph S indicates sagittal, which is a ray incident in a direction parallel to the lens, and graph T indicates tangential, which is a ray incident in a direction perpendicular to the lens. It is known that the more graphs S and T approach each other and approach the central vertical axis, the better the efficiency of correcting astigmatism aberration. The astigmatism aberration according to the third embodiment of the present invention is 0.025 mm (focus) or less, which is determined to be good.

Third data of FIG. 7 show distortion aberration, wherein the horizontal axis indicates distortion degree (%), and the vertical axis indicates image height (mm). In general, it is known that, in the case in which an aberration curve is within a range of −2 to 2%, distortion aberration is good. Optical distortion, as the distortion aberration according to the third embodiment of the present invention, is 2% or less, which is determined to be good.

As is apparent from the above description, the present invention, which relates to a lens system including a total of five lenses, provides a small lens system configured such that a first lens, a second lens, a third lens, a fourth lens, and a fifth lens are sequentially arranged from an object along an optical axis, wherein chromatic aberration of the lens system is corrected while the lens system is small and lightweight by appropriately designing the refractive power and shape of each lens, whereby the lens system is easily applicable to a small high-resolution camera module, particularly a smartphone.

Also, in the prevent invention, the first lens is configured such that the clear aperture of an image-side surface is greater than the clear aperture of an object-side surface while a convex object-side surface is provided, and the third lens is configured to have a concave or flat object-side surface and a concave image-side surface, which is advantageous in assembly of the lenses and application to a small camera module.

In addition, the clear aperture of the object-side surface L1S1_CA (clear aperture) and the clear aperture of the image-side surface L1S2_CA (clear aperture) of the first lens satisfy 1<L1S2_CA/L1S1_CA<1.2, which is further advantageous in miniaturization of a lens system and correction of aberration of the lens system and minimizes optical loss, whereby it is possible to obtain a more vivid image in low light conditions.

Also, in the lens system according to the present invention, a total of five lenses is used, and the distance TTL from the center of the first lens to an image surface and an image surface height ImageH satisfy TTL/ImageH<4.8, whereby it is possible to design the lens system such that the lens system is thinner and to provide a high-resolution lens system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A small lens system comprising a first lens, a second lens, a third lens, a fourth lens, and a fifth lens sequentially disposed from an object, wherein a stop is located between the second lens and the third lens, the first lens has a negative refractive power, a convex object-side surface, and a clear aperture of an image-side surface greater than a clear aperture of an object-side surface, the second lens has a positive refractive power and a convex object-side surface, the third lens has a negative refractive power, a concave object-side surface, and a concave image-side surface, the fourth lens has a negative refractive power and a convex object-side surface, the fifth lens has a positive refractive power, a convex object-side surface, and a convex image-side surface, and the clear aperture of the object-side surface L1S1_CA (clear aperture) and the clear aperture of the image-side surface L1S2_CA (clear aperture) of the first lens satisfy $1 < L1S2\_CA/L1S1\_CA < 1.2$, wherein at least one of:

an axial distance Sag21 from a center of the object-side surface to an outermost side of the clear aperture of the object-side surface of the first lens and an axial distance Sag22 from a center of the image-side surface to an outermost side of the clear aperture of the image-side surface of the first lens satisfy $0.3 < Sag22/Sag21 < 0.6$, a center thickness L1_CT of the first lens and a center thickness L2_CT of the second lens satisfy $0.16 < L1\_CT/L2\_CT < 0.22$, a distance TTL from a center of the first lens to an image surface and an image surface height ImageH satisfy $TTL/ImageH < 4.8$, and an effective focal distance f of the lens system and an entrance pupil diameter EPD of the lens system satisfy $f/EPD < 2.8$.

2. The small lens system according to claim 1, wherein the axial distance Sag21 from the center of the object-side surface to the outermost side of the clear aperture of the object-side surface of the first lens and the axial distance Sag22 from the center of the image-side surface to the outermost side of the clear aperture of the image-side surface of the first lens satisfy $0.3 < Sag22/Sag21 < 0.6$.

3. The small lens system according to claim 1, wherein an effective focal distance f of the lens system and a focal distance f2 of the second lens satisfy $2 < f/f2 < 3$.

4. The small lens system according to claim 1, wherein the center thickness L1_CT of the first lens and the center thickness L2_CT of the second lens satisfy $0.16 < L1\_CT/L2\_CT < 0.22$.

5. The small lens system according to claim 1, wherein the distance TTL from the center of the first lens to the image surface and the image surface height ImageH satisfy $TTL/ImageH < 4.8$.

6. The small lens system according to claim 1, wherein a center thickness L2_CT of the second lens and an edge thickness L2_ET of the second lens satisfy $1.33 < L2\_CT/L2\_ET < 3$.

7. The small lens system according to claim 1, wherein the effective focal distance f of the lens system and the entrance pupil diameter EPD of the lens system satisfy $f/EPD < 2.8$.

8. The small lens system according to claim 1, wherein a field of view FOV of the lens system satisfies $FOV < 22°$.

9. The small lens system according to claim 1, wherein all surfaces of the first to fifth lenses are formed as aspherical surfaces, and each of the first to fifth lenses is made of a plastic material.

10. A small lens system comprising a first lens, a second lens, a third lens, a fourth lens, and a fifth lens sequentially disposed from an object, wherein a stop is located between the second lens and the third lens, the first lens has a positive refractive power, a convex object-side surface, and a clear aperture of an image-side surface greater than a clear aperture of the object-side surface, the second lens has a positive refractive power and a convex object-side surface, the third lens has a negative refractive power, a flat object-side surface, and a concave image-side surface, the fourth lens has a negative refractive power and a convex object-side surface, the fifth lens has a positive refractive power and a convex object-side surface, and the clear aperture of the object-side surface L1S1_CA (clear aperture) and the clear aperture of the image-side surface L1S2_CA (clear aperture) of the first lens satisfy $1 < L1S2\_CA/L1S1\_CA < 1.2$, wherein at least one of:

an axial distance Sag21 from a center of the object-side surface to an outermost side of the clear aperture of the object-side surface of the first lens and an axial distance Sag22 from a center of the image-side surface to an outermost side of the clear aperture of the image-side surface of the first lens satisfy $0.3 < Sag22/Sag21 < 0.6$, a center thickness L1_CT of the first lens and a center thickness L2_CT of the second lens satisfy $0.16 < L1\_CT/L2\_CT < 0.22$, a distance TTL from a center of the first lens to an image surface and an image surface height ImageH satisfy $TTL/ImageH < 4.8$, and an effective focal distance f of the lens system and an entrance pupil diameter EPD of the lens system satisfy $f/EPD < 2.8$.

11. The small lens system according to claim 10, wherein the axial distance Sag21 from the center of the object-side surface to the outermost side of the clear aperture of the object-side surface of the first lens and the axial distance Sag22 from the center of the image-side surface to the outermost side of the clear aperture of the image-side surface of the first lens satisfy $0.3 < Sag22/Sag21 < 0.6$.

12. The small lens system according to claim 10, wherein an effective focal distance f of the lens system and a focal distance f2 of the second lens satisfy $2 < f/f2 < 3$.

13. The small lens system according to claim 10, wherein the center thickness L1_CT of the first lens and the center thickness L2_CT of the second lens satisfy $0.16 < L1\_CT/L2\_CT < 0.22$.

14. The small lens system according to claim 10, wherein the distance TTL from the center of the first lens to the image surface and the image surface height ImageH satisfy $TTL/ImageH < 4.8$.

15. The small lens system according to claim 10, wherein a center thickness L2_CT of the second lens and an edge thickness L2_ET of the second lens satisfy $1.33 < L2\_CT/L2\_ET < 3$.

16. The small lens system according to claim 10, wherein the effective focal distance f of the lens system and the entrance pupil diameter EPD of the lens system satisfy $f/EPD < 2.8$.

17. The small lens system according to claim 10, wherein a field of view FOV of the lens system satisfies $FOV < 22°$.

18. The small lens system according to claim 10, wherein
all surfaces of the first to fifth lenses are formed as
aspherical surfaces, and
each of the first to fifth lenses is made of a plastic material.

* * * * *